(12) United States Patent
Digonnet et al.

(10) Patent No.: US 6,886,404 B2
(45) Date of Patent: May 3, 2005

(54) FIBER OPTIC ACCELEROMETER

(75) Inventors: Michel J. F. Digonnet, Palo Alto, CA (US); Elliot M. Burke, Goleta, CA (US); John J. Fling, Little River, CA (US)

(73) Assignee: Fibersonde Corporation, Santa Barbara, CA (US)

( * ) Notice: Subject to any disclaimer, the term of this patent is extended or adjusted under 35 U.S.C. 154(b) by 0 days.

(21) Appl. No.: 10/358,649

(22) Filed: Feb. 5, 2003

(65) Prior Publication Data

US 2004/0149037 A1 Aug. 5, 2004

(51) Int. Cl.[7] .............................................. G01P 15/08
(52) U.S. Cl. .................................... 73/514.27; 356/477
(58) Field of Search ...................... 73/514.27, 514.26, 73/514.19, 653; 356/481, 482, 483, 477

(56) References Cited

U.S. PATENT DOCUMENTS 4,233,847 A * 11/1980 Walker ..................... 73/514.27
4,739,661 A * 4/1988 Bucholtz et al. .......... 73/514.26
4,900,918 A * 2/1990 Killian ..................... 73/514.27
5,891,747 A * 4/1999 Farah ......................... 356/482

* cited by examiner

Primary Examiner—John E. Chapman
(74) Attorney, Agent, or Firm—Lynn & Lynn

(57) ABSTRACT

An acceleration transducer for use in an accelerometer includes a proof mass that comprises a transmissive optics device arranged to receive an optical signal such that the optical signal propagates through the transmissive optics device along a first optical path having a selected optical path length. A support assembly is arranged to support the proof mass such that the transmissive optics device moves from a reference position along a selected sensing axis in response to an acceleration of the proof mass along the selected sensing axis and produces an optical path length change that indicates the acceleration.

16 Claims, 6 Drawing Sheets

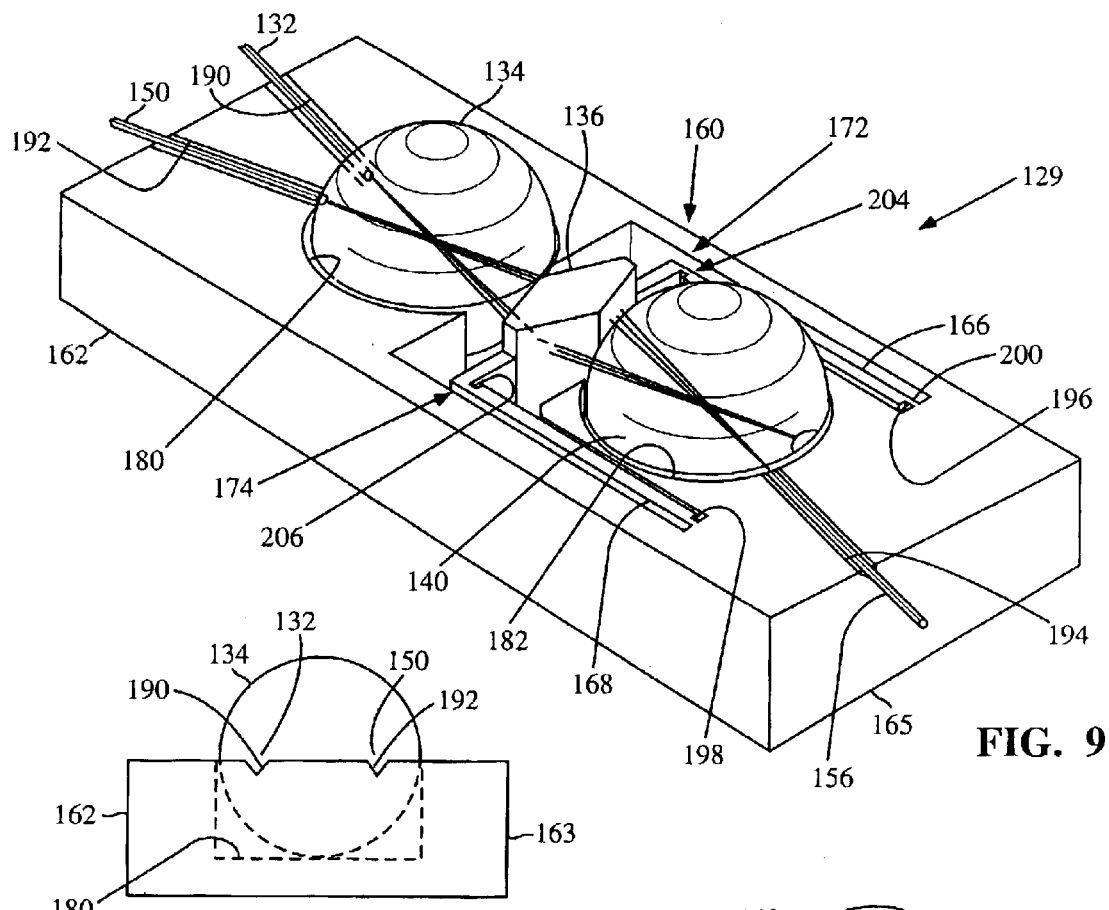
FIG. 9
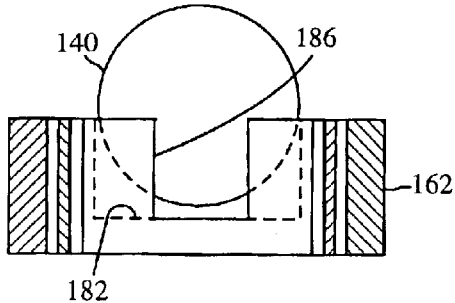
FIG. 10
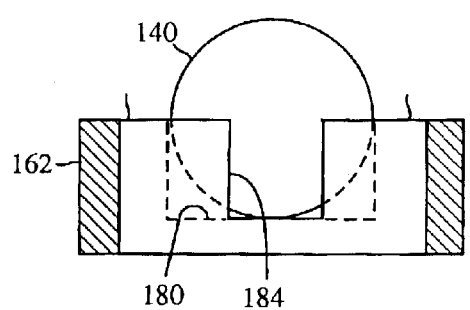
FIG. 11
FIG. 12

FIBER OPTIC ACCELEROMETER

BACKGROUND OF THE INVENTION

This invention relates generally to fiber optic accelerometers and to methods for forming such accelerometers.

SUMMARY OF THE INVENTION

This invention is directed to an acceleration transducer for use in an accelerometer. The acceleration transducer includes a proof mass that comprises a transmissive optics device arranged to receive an optical signal such that the optical signal propagates through the transmissive optics device along a first optical path having a selected optical path length. A support assembly is arranged to support the proof mass such that the transmissive optics device moves from a reference position along a selected sensing axis in response to an acceleration of the proof mass along the selected sensing axis and produces an optical path length change that indicates the acceleration.

The transmissive optics device may comprise a prism. The transmissive optics device may alternatively comprise a slab of optical material having a refractive index gradient in the direction of the sensing axis.

The support assembly may comprise a base having a first cavity therein and a first linkage arm extending from the base into the first cavity. The support assembly may further comprise a second linkage arm extending from the base into the first cavity with the proof mass being connected between the first and second linkage arms. The first and second linkage arms preferably are parallel, and the proof mass is preferably arranged so that the sensing axis is perpendicular to the first and second linkage arms.

The transducer may further comprise a first hinge formed in the first linkage arm and a second hinge formed in the second linkage arm with the first and second hinges being arranged to facilitate movement of the proof mass along the sensing axis in response to acceleration along the sensing axis.

The transducer may also further comprise a first damping member mounted in the first cavity between the first linkage arm and the frame and a second damping member mounted in the first cavity between the second linkage arm and the frame with the first and second damping members being arranged to control movement of the proof mass in response to acceleration along the sensing axis.

The transducer may further comprise a first lens mounted to the frame and a second lens mounted to the frame such that the transmissive optics device is between the first and second lenses. A first optical fiber may be mounted to the frame with an end of the first optical fiber being arranged to be adjacent the first lens and a second optical fiber mounted to the frame with an end of the second optical fiber arranged to be adjacent the first lens. A third optical fiber may be mounted to the frame with and end of the third optical fiber being arranged to be adjacent the second lens. A reflector may be mounted to the second lens, and the first, second and third optical fibers, the transmissive optics device and the reflector may be arranged such that a first light beam travels from the first optical fiber through the first lens, the transmissive optics device and the second lens into the third optical fiber to form a portion of a Sagnac interferometer and such that a second light beam travels from the second optical fiber through the first lens, the transmissive optics device and the second lens to the reflector and back through the second lens, the transmissive optics device and the first lens to the second optical fiber to form a portion of a Michelson interferometer.

The first lens is preferably mounted in a first recess in the base and the second lens is preferably mounted in a second recess in the base.

The features of the invention may be more fully understood and appreciated by referring to the drawings described briefly below and by referring to the detailed description of the invention.

BRIEF DESCRIPTION OF THE DRAWINGS

FIG. 9 is a perspective view of the sensor configuration of FIG. 8;

FIG. 10 is a left end elevation view of the sensor configuration of FIGS. 8 and 9;

FIG. 11 is a cross sectional view taken along line 11—11 of FIG. 9;

FIG. 12 is a cross sectional view taken along line 12—12 of FIG. 9; and

DETAILED DESCRIPTION OF THE INVENTION

Figure 1:
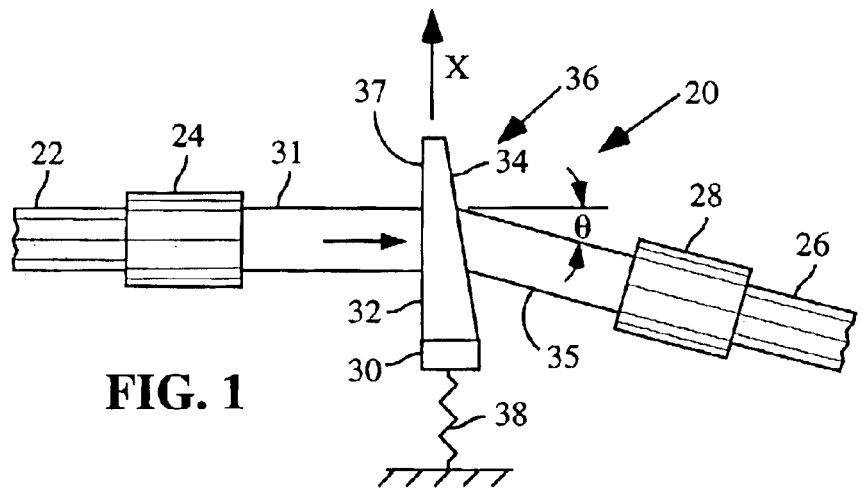
FIG. 1 is a side elevation view of an optical acceleration transducer according to the invention for measuring acceleration.

FIG. 1 illustrates an optical transducer 20 that may be used to provide a signal in response to linear acceleration in a selected direction that, by way of example, is upward in the plane of the sheet as indicated by arrow X. The transducer 20 includes a first optical fiber 22 that terminates at a first collimator 24 and a second optical fiber 26 that terminates at a second collimator 28. A mass 30 is attached to a transmissive optics device 36 that is suspended at a reference position between the first and second collimators 24 and 28 so that it moves in the direction X by an amount that varies with the linear acceleration of the transmissive optics device 36 in direction X. A spring 38 is mounted between a fixed point and the mass 30 acts as a restoring force that works against the external acceleration and moves the prism back to the reference postion in the absence of acceleration. In the embodiment of the invention shown in FIG. 1, the transmissive optics device 36 may be in the form of a prism 37.

The first collimator 24 and the transmissive optics device 36 are arranged so that a light beam 31 guided by the first optical fiber 22 to the first collimator 24 is directed by the first collimator to a first surface 32 of the transmissive optics device 36. The light beam 31 propagates through the transmissive optics device 36 and emerges from the transmissive optics device 36 at a second surface 34. In the embodiment shown in FIG. 1 the surfaces 32 and 34 are opposite sides of the prism 37 so that the light beam that emerges therefrom is refracted. The second collimator 28 is arranged so that at least part of the light beam 31 that emerges from the side 34 of the prism 37 is incident on the second collimator 28. The second collimator 28 then introduces the light beam into the second optical fiber 26. The transmissive optics device 36 has an optical characteristic that introduces an optical path length difference between the first and second collimators 24 and 28 as a function of displacement in the X-direction.

Likewise, a light beam 35 guided by the second optical fiber 26 to the second collimator 28 is directed to the surface 34 of the prism 37 where it enters the transmissive optics device 36 and is refracted. The refracted beam emerges at the surface 32 of the transmissive optics device 36, is received by the collimator 24 and is input to the first optical fiber 22.

Figure 2:
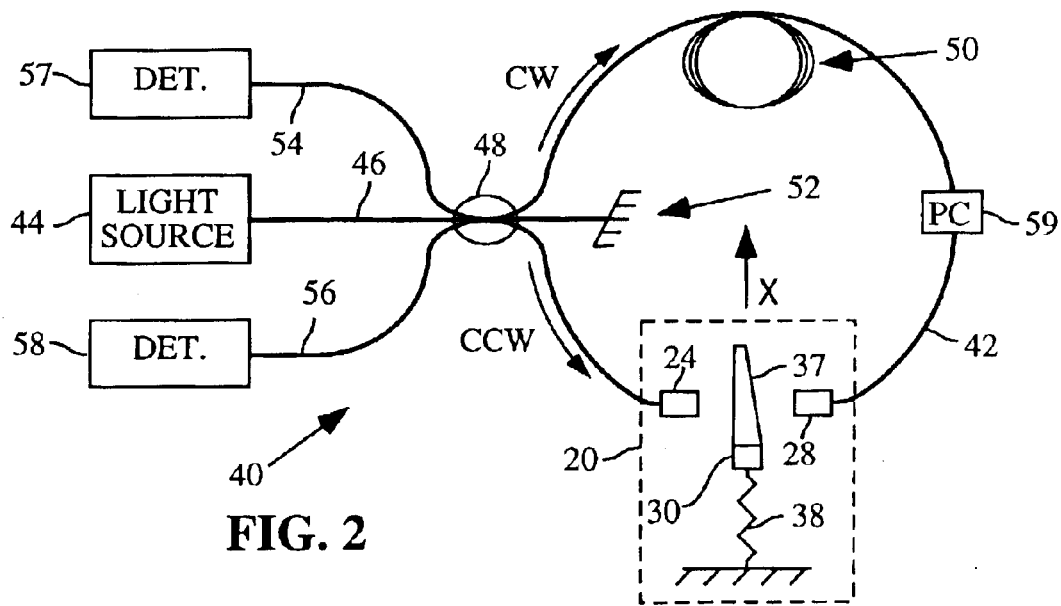
FIG. 2 schematically illustrates a Sagnac interferometer that includes an optical transducer constructed in accordance with the invention as shown in FIG. 1.

FIG. 2 schematically illustrates a representative structure for a Sagnac interferometer 40 that includes the optical transducer 20. The Sagnac interferometer 40 includes a fiber optic sensing loop 42 that is connected to a coupler 48 and arranged to guide two counter-propagating light waves that are indicated by the arrows CW (clockwise) and CCW (counterclockwise). The transducer 20 preferably is placed asymmetrically in the sensing loop 42 so the optical path from one port of the coupler 48 to the transducer 20 is shorter than the optical path to the other port. Having the transducer 20 placed asymmetrically in the Sagnac loop 42 provides increased sensitivity to low frequency signals.

The Sagnac interferometer 40 includes a broadband optical signal source 44. Optical signal sources suitable for use in Sagnac interferometer systems are well-known in the art and are therefore not described herein. An optical signal from the optical signal source 44 is guided by an optical fiber 46 to the optical coupler 48, which preferably is a 3×3 optical coupler well-known in the art. The coupler 48 couples a first part of the optical signal from the optical fiber 46 into the sensing loop 42 to form the CW wave and couples a second part of the optical signal from the optical fiber 46 into the sensing loop 42 to form the CCW wave. In the exemplary embodiment shown in FIG. 2, the CW wave passes through a delay coil 50 before reaching the transducer 20. An optical terminator 52 absorbs any light that is guided by the optical fiber 46 to the optical coupler 48 that is not coupled into the sensing loop 42.

Although they are not described herein, it should be recognized that forming the Sagnac interferometer 40 normally will require several fiber optic splices or low-reflection connectors as well-known in the art to connect the various components thereof as shown and described.

After traversing the sensing loop 42, the delay coil 50 and the transducer 20, the CW and CCW waves combine in the optical coupler 48 and produce an interference pattern that comprises the optical signal output from the Sagnac interferometer 40. The optical coupler 48 couples the optical signal output into an optical fiber 54 and an optical fiber 56 that direct the optical signal output to corresponding photodetectors 57 and 58, respectively. The photodetectors 57 and 58 produce electrical signals that indicate the intensity of the optical signal.

An AC acceleration at frequency F in direction X causes the mass 30 to oscillate with a certain amplitude x along the X-axis. As the position of the mass 30 oscillates along the X-axis, the optical beam 31 therefore travels through a thickness of the prism 37 that is also modulated, which in turn produces an optical path length difference between the CW and CCW waves that is modulated at frequency F. The optical path length difference causes a phase change between the counter-propagating waves.

Even though the CW and CCW signals have traveled the same optical paths, they have gone through them in opposite directions, and the residual birefringence of the fiber sensing loop 42 will cause these two signals to have in general different states of polarization (SOPs). If the polarizations happen to be orthogonal, the two signals cannot interfere, leading to no modulation on the output signal detected by detectors 57 and 58. This effect is known in the art as polarization fading. Several standard methods well known in the art can be used to avoid polarization fading. One method is to place a polarization controller (PC) 59 in the Sagnac loop 42. The PC 59 is then adjusted to make sure that the SOPs of the CW and CCW signals are substantially the same at point where the coupler 48 combines them. This adjustment needs to be dynamic for long Sagnac loops, as small changes in the environment of the loop fiber will change the fiber birefringence, and thus the SOPS of the CW and CCW signals at the output of the sensing loop 42. Several schemes can be used to adjust the PC 59, for example through a feedback loop that maximizes the power transmitted by polarizer 48, i.e. that maximizes the detected signal power at the detectors 57 and 58. Another scheme to avoid polarization fading is to make the Sagnac sensing loop 42 with a polarization-maintaining (PM) fiber. Techniques for avoiding polarization effects in Sagnac interferometers as well as a variety of multiple sensor multiplexing methods are described in issued patents U.S. Pat. No. 6,278,657B1, U.S. Pat. No. 6,034,924 and U.S. Pat. No. 6,097,486 as well as much published literature.

Figure 3:
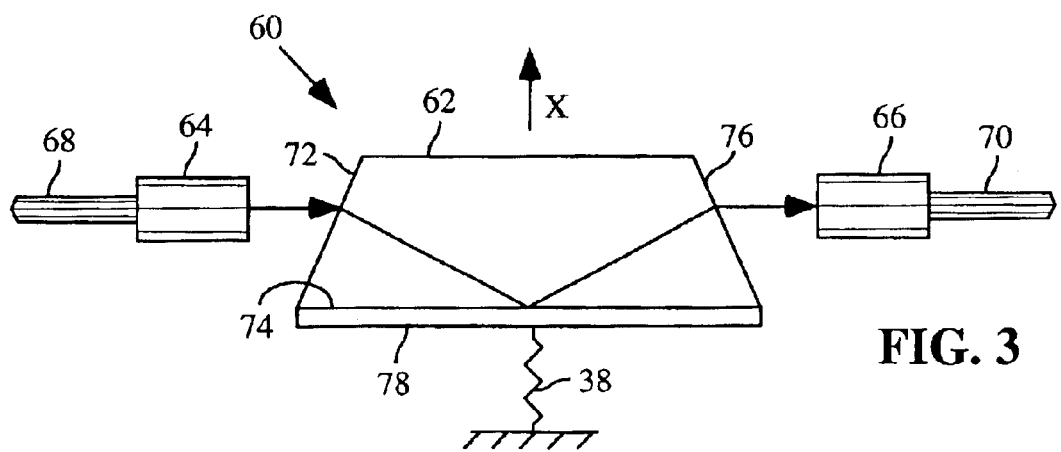
FIG. 3 is a side elevation view of a first alternative embodiment of an acceleration transducer according to the invention utilizing a Dove prism

FIG. 3 illustrates a transducer 60 that may be used in the Sagnac interferometer 40 instead of the transducer 20 of FIG. 1. A Dove prism 62 is placed between two collimators 64 and 66 that are connected to optical fibers 68 and 70, respectively. The collimator 64 directs a light beam guided by the optical fiber 68 to a surface 72 of the prism 62 where the light beam refracts. The refracted light beam in the prism impinges upon a surface 74 of the prism 62 and reflects therefrom to a surface 76 where it again refracts upon propagating from the prism to the surrounding region (air, vacuum or liquid). The twice-refracted beam then is incident upon the collimator 66, which introduces the light beam into the optical fiber 70.

An outer portion of the prism surface 62 may have a high reflectivity coating 78 formed thereon to maximize the fraction of the light beam power reflected at the surface 74. Alternatively, the refractive index of the material from which prism 62 is formed and the prism angles may be selected such that the light beam is totally internally reflected at the surface 74.

The transducer 60 is formed such that a light beam directed to the prism surface 76 from collimator 66 on the right side of FIG. 3 refracts to the surface 74 and then propagates to the surface 72 for refraction to the collimator 64. The collimator 64 then introduces the light beam into the optical fiber 68. The transducer 60 has the advantage that the light beams input to and output from the prism 62 are parallel.

The optical path length between the collimators 64 and 66 depends on the position of the prism along the X direction. Therefore, acceleration of the prism 62 in the X-direction changes the optical path length of the light beam in the prism 62 and produces a corresponding phase change in the counter-propagating beams. Acceleration of the prism 62 in the sensing direction X produces a time-varying phase change that is related linearly to the linear acceleration of the prism.

It should be recognized that in the case of the prisms of either FIG. 1 or FIG. 3, the displacement along x imparted to the transducer 20 or 60 by an applied acceleration not only changes the optical path length of the beam through the prisms 37 and 62, but it also causes a lateral displacement of the optical beam. For example, in the particular case of FIG. 3 if the prism 62 is moved up (direction+x), the optical beam that comes out of prism output face 76 is also slightly displaced in the x direction, although it remains parallel to itself. This parallel displacement spoils the alignment of the output beam into the collimator 66, and therefore the coupling efficiency of the beam into the fiber 70. The same is true in the opposite propagation direction: the beam traveling from right to left in FIG. 3 comes out of output face 72 parallel to itself but slightly shifted in the x direction. This effect is undesirable because as the prism position along x is modulated by the AC acceleration applied to the prism, the coupling efficiency is also modulated at the same frequency, which imparts an amplitude modulation on both the CW and the CCW signals. Although these modulations are substantially identical, they add a small component at the frequency of the acceleration to the output signal.

This effect can be minimized in two ways. The first method, which is applicable to both the transducers of FIG. 1 and FIG. 3, is to select a very small prism angle α, namely the angle between the optical faces 32 and 34 for the prism 37 of FIG. 1, and the angle between the optical faces 72 and 76 for the prism of FIG. 3. It can be shown with simple trigonometry that if the applied acceleration imparts to the prism of FIG. 1 a displacement H in x, the lateral displacement Δ that the CW and CCW output beams suffer is equal to:

$$\Delta \approx (n_1 - 1)H\alpha^2 \quad (1)$$

where the prism angle has been assumed to be small. For this prism displacement H, the phase modulation imparted to the CW signal is, assuming a small prism angle:

$$\Delta\phi \approx \frac{2\pi}{\lambda}(n_1 - 1)H\alpha \quad (2)$$

where λ is the optical wavelength of the signals, and $n_1$ the refractive index of the prism at wavelength λ.

At the output of the Sagnac interferometer 40, the resulting phase modulation is the difference between the phase modulation seen by the CW signal (given by Eq. 2) and the phase modulation seen by the CCW signal a time $T_d$ later. This resulting phase modulation is:

$$\phi_s = 2\Delta\phi \sin\left(\frac{\omega T_d}{2}\right) \quad (3)$$

where ω is the angular frequency of the AC acceleration. The first resonant frequency of the Sagnac interferometer 40 is given by $\Omega T_d/2 = \pi/2$, or $\Omega = \pi/T_d$. For frequencies sufficiently below Ω, Eq. 3 can be approximated by:

$$\phi_s \approx \Delta\phi\omega T_d, \quad (4)$$

or, using Eq. 2:

$$\phi_s \approx \frac{2\pi}{\lambda}(n_1 - 1)H\alpha\omega T_d \quad (5)$$

As an example of a Sagnac accelerometer design for a maximum AC frequency of 2 KHz, take a resonant frequency of 5 kHz (or $\Omega=3.14\ 10^4$ rad/s) sufficiently far above the target maximum acceleration frequency of 2 kHz. Assume an optical wavelength λ=1.5 μm and a prism index $n_1$=1.45. To obtain such a resonant frequency the time delay must be $T_d=\pi/\Omega=100$ μs or a fiber coil length $L_d$=20.7 km. Assume that the mass 30 and the spring stiffness are selected such that the maximum displacement at the maximum targeted detectable acceleration of 1 g is H=10 mm. Eq. 1 then states that to have a beam displacement of only 0.1 μm or less, small enough to impart undetectable amplitude modulation to the CW and CCW signals, the prism angle must be 4.7 mrad or less. Select a prism angle α=4 mrad. The resulting phase modulation (Eq. 5) at an acceleration frequency of 10 Hz (or ω=62.8 rad/s) is then 0.47 rad. The maximum detectable acceleration at 10 Hz (i.e. a resulting phase of π) is therefore π/0.47=6.7 g. The minimum detectable acceleration at 10 Hz, assuming that the minimum detectable phase for this Sagnac interferometer is 0.5 μrad (medium accuracy value), is about $10^{-6}$ g. The dynamic range is 136 dBV.

Figure 4:
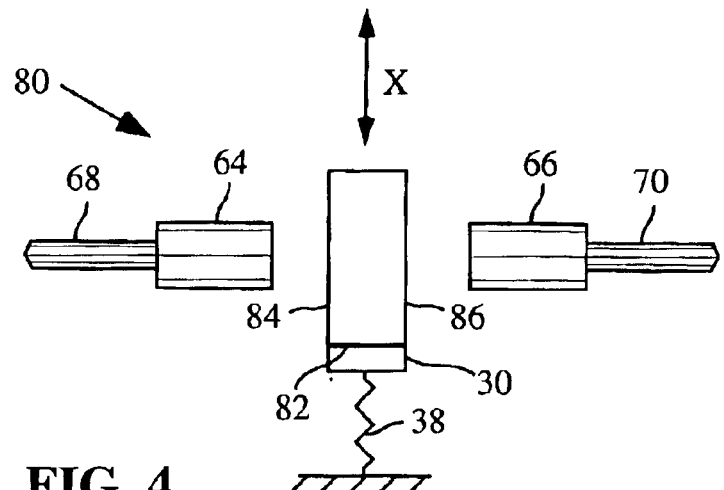
FIG. 4 is a side elevation view of a second alternative embodiment of an acceleration transducer according to the invention.

Another way to reduce the undesirable lateral displacement of the optical beams is to use a transducer 80 illustrated in FIG. 4. The optical acceleration transducer 80 of FIG. 4 also has parallel input and output light beams. The transducer 80 preferably has collimators 64 and 66 and optical fibers 68 and 70 arranged as described with respect to FIG. 3. An optical slab 82 is placed between the collimators 64 and 66. The optical slab 82 has parallel sides 84 and 86 that are arranged to receive light beams output from the collimators 64 and 66, respectively. The optical slab 82 is formed of a material that has a refractive index gradient in the X-direction. The refractive index gradient is preferably a linear function of position along the X-direction.

In response to an acceleration in x, the slab 82 moves along x, and the optical signals traveling through it, either from collimator 64 to collimator 64, or in the opposite directions, traverse a region of different average refractive index. Therefore their phase is modulated. Again, because of the Sagnac interferometer 40, the phases seen by the CW and CCW signals, which arrive at the slab 82 at different times, are generally different, which translates into a net phase modulation at the output of the interferometer 40.

Figure 5:
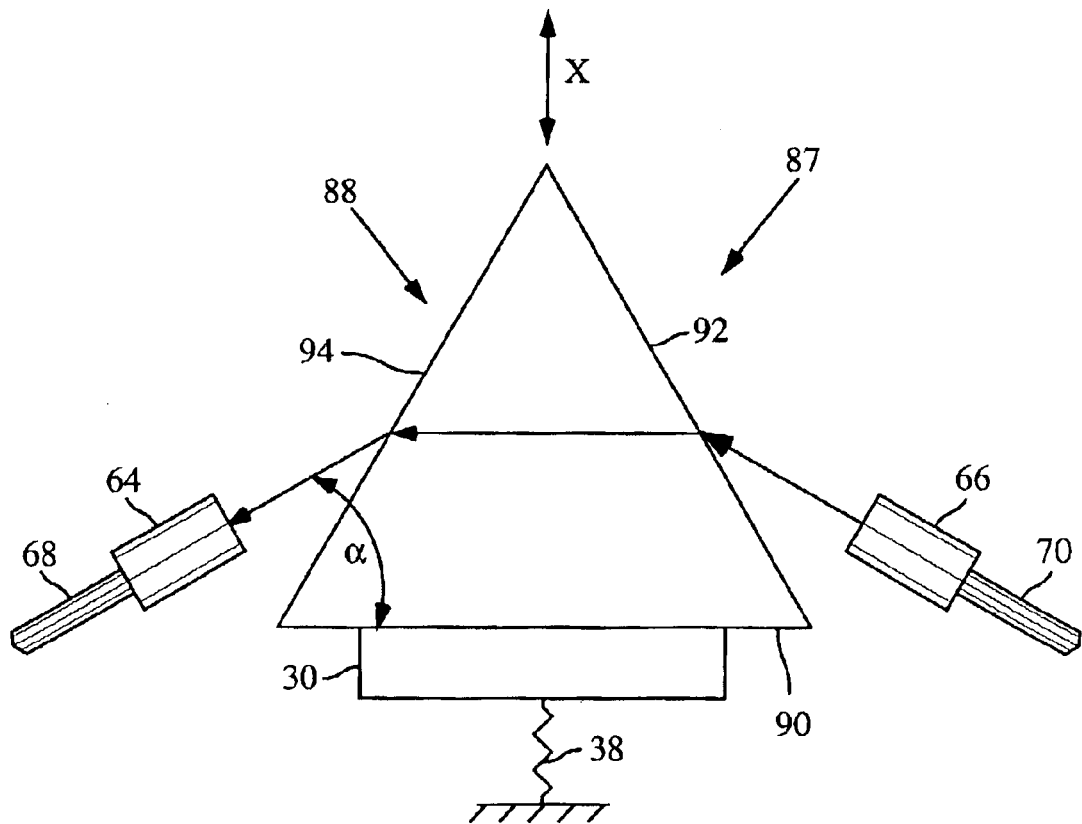
FIG. 5 is a side elevation view of a third alternative embodiment of a transducer according to the invention.

FIG. 5 shows a transducer 87 according to the present invention that includes a prism 88 that is an equilateral triangle when seen in the side elevation. The prism 88 has a base 90 and sides 92 and 94. The optical fibers 68 and 70 and corresponding collimators 64 and 66 of FIG. 4 may be used to direct light beams to and from the prism 88. An arrow extending from the collimator 66 represents a light beam that is directed to the side 92 of the prism 88. The angle of incidence α is preferably selected such that the light beam refracts into the prism 88 such that it traverses the prism parallel to the base 90. The preferred angle of incidence depends upon the refractive indices of the medium between the collimator 66 and the prism 88 and upon the refractive index of the prism. Once these refractive indices are known, the angle of incidence for the refraction to a path that is parallel to the base 90 may be calculated using Snell's law. This angle of incidence that produces an optical path parallel to the base 90 is sometimes referred to as the "minimum angle."

Having the refracted beam in the prism be parallel to the base 92 has the advantage that as the prism is displaced along direction X, the optical beams do not change position relative to the collimators 64 and 66. If the light beam shifts position relative to the collimators 64 and 66, there will be both intensity and phase errors in the interferometer.

After propagating through the prism 88, the light beam refracts at the surface 94 to be received by the collimator 64, which collects the light beam and injects it into the optical fiber 68. The transducer 87 may include the proof mass 30 and spring 38 described with reference to FIG. 1.

Transducers 20, 60, 80 and 76 according to the present invention have been described as being used in combination with a Sagnac interferometer 40. However, the invention should not be viewed as being limited to being useful only with such interferometers. The invention may be used with any type of optical interferometer such as Mach-Zehnder, Michelson or Fabry-Perot. By way of example only, FIGS. 6 and 7 show the transducer 20 included in a Mach-Zehnder interferometer 100 and a Michelson 102, respectively.

Figure 6:
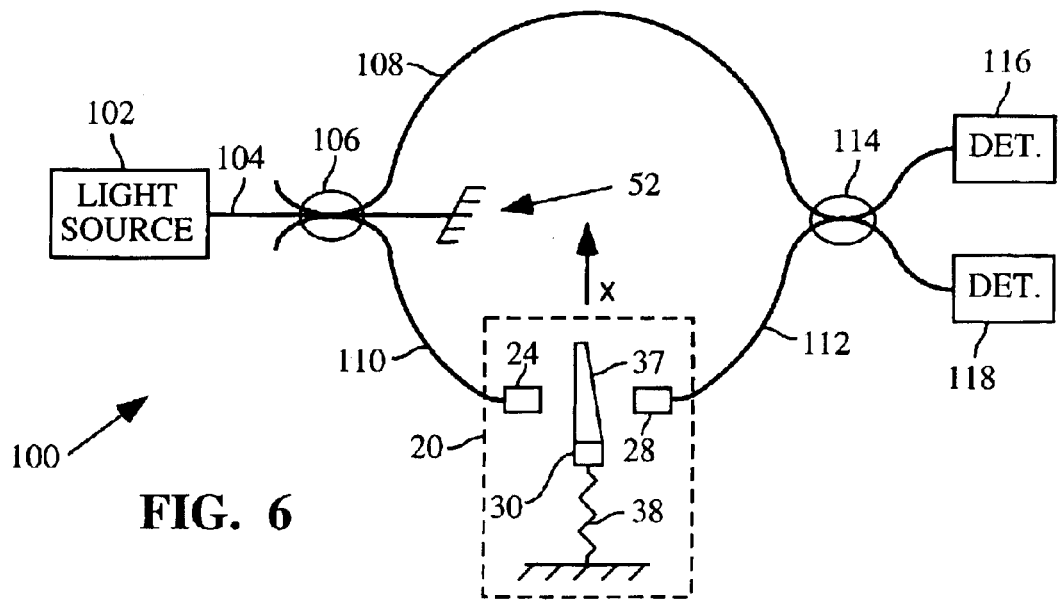
FIG. 6 schematically illustrates a Mach-Zehnder interferometer that includes an optical transducer constructed in accordance with the invention as shown in FIG. 1.

As shown in FIG. 6, the Mach-Zehnder interferometer 100 includes a light source 102 that provides an optical signal to an optical fiber 104. The optical fiber 104 guides the optical signal to an optical coupler 106, which may be substantially identical to the optical coupler 48 of FIG. 7. The optical coupler 106 divides the optical signal between two optical fibers 108 and 110. The transducer 20 of FIG. 1 is shown connected between the optical fiber 110 and an optical fiber 112. A change in acceleration of the proof mass 30 produces a change in the optical signal that is transmitted through the transducer 20 from the optical fiber 110 to the optical fiber 112. The optical fibers 108 and 112 are connected to an optical coupler 114 that is arranged to combine optical signals guided by the optical fibers 108 and 110. The optical fibers 112 and 114 guide the coupler output to corresponding detectors 116 and 118.

Figure 7:
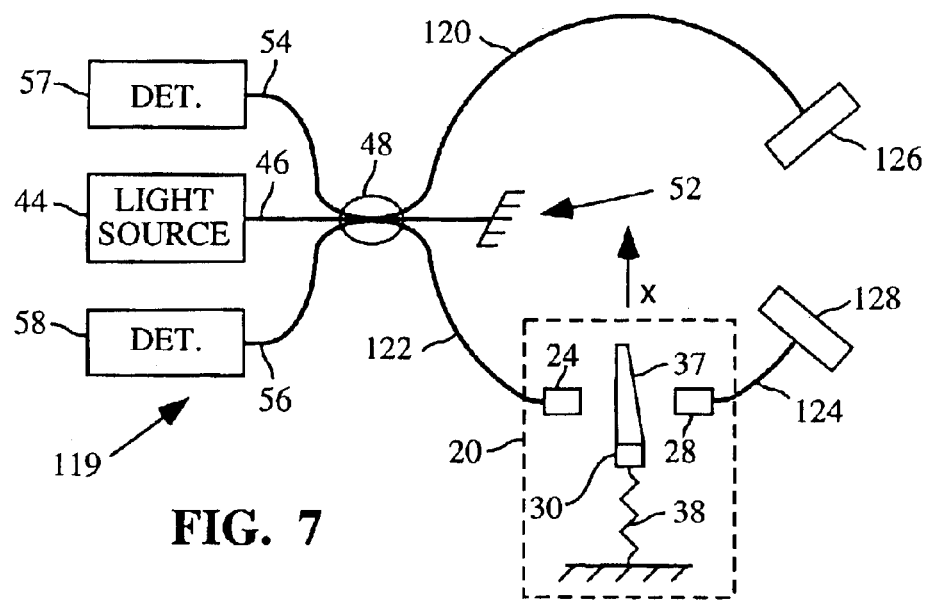
FIG. 7 schematically illustrates a Michelson interferometer that includes an optical transducer constructed in accordance with the invention as shown in FIG. 1.

Referring to FIG. 7, a Michelson interferometer 119 may include the same arrangement of optical signal source 44, optical fiber 46, and 56, detector 58 and optical coupler 48 of FIG. 2. The optical coupler 48 divides the optical signal from the optical signal source 44 between a pair of optical fibers 120 and 122. The transducer 20 of FIG. 1 is shown connected between the optical fiber 122 and an optical fiber 124. A change in acceleration of the proof mass 30 produces a change in the optical signal that is transmitted through the transducer 20 from the optical fiber 122 to the optical fiber 124. The optical fibers 120 and 124 terminate at reflectors 126 and 128, respectively. Optical signals guided by the optical fibers 120 and 124 reflect from the reflectors 126 and 128, respectively and propagate back to the optical coupler 48. The optical coupler 48 combines the reflected signals and then divides the combination between the optical fibers 54 and 56, which then provide signals to the detectors 57 and 58.

FIGS. 8–12 illustrate a transducer 129 in accordance with the invention arranged to provide a very compact combination of a Michelson interferometer optical path and a Sagnac optical path utilizing a back-to-back equi-angular prism 130. This arrangement permits the use of the Sagnac interferometer with the Michelson interferometer such that the wide dynamic range and common mode rejection characteristics of the Sagnac configuration can be coupled with the ability of the Michelson interferometer to measure static acceleration. In addition this is accomplished with the use of a common set of optical components.

Light from an optical fiber 132 is collimated by a first ball lens 134 to form an optical beam 136. The optical bean 136 traverses an optical path that extends through a lower portion 137 of the prism 130 and enters a second ball lens 140. The ball lenses 134 and 140 preferably are formed of silicon dioxide (SiO2). The optical beam 136 is focused at a reflector 142 that is located on the surface 144 of ball lens 140. The optical beam reflects from the reflector 142 and traverses the optical path in the opposite direction to re-enter the optical fiber 132, forming the active leg of a balanced or unbalanced Michelson interferometer.

Light from an optical fiber 150 is collimated by a first ball lens 134 to form an optical beam 152 that traverses an optical path that extends through an upper portion 155 of the prism 130 before entering the ball lens 140. The optical beam 152 is focused so that it efficiently enters an optical fiber 156 to form the active leg of a Sagnac interferometer.

Figure 8:
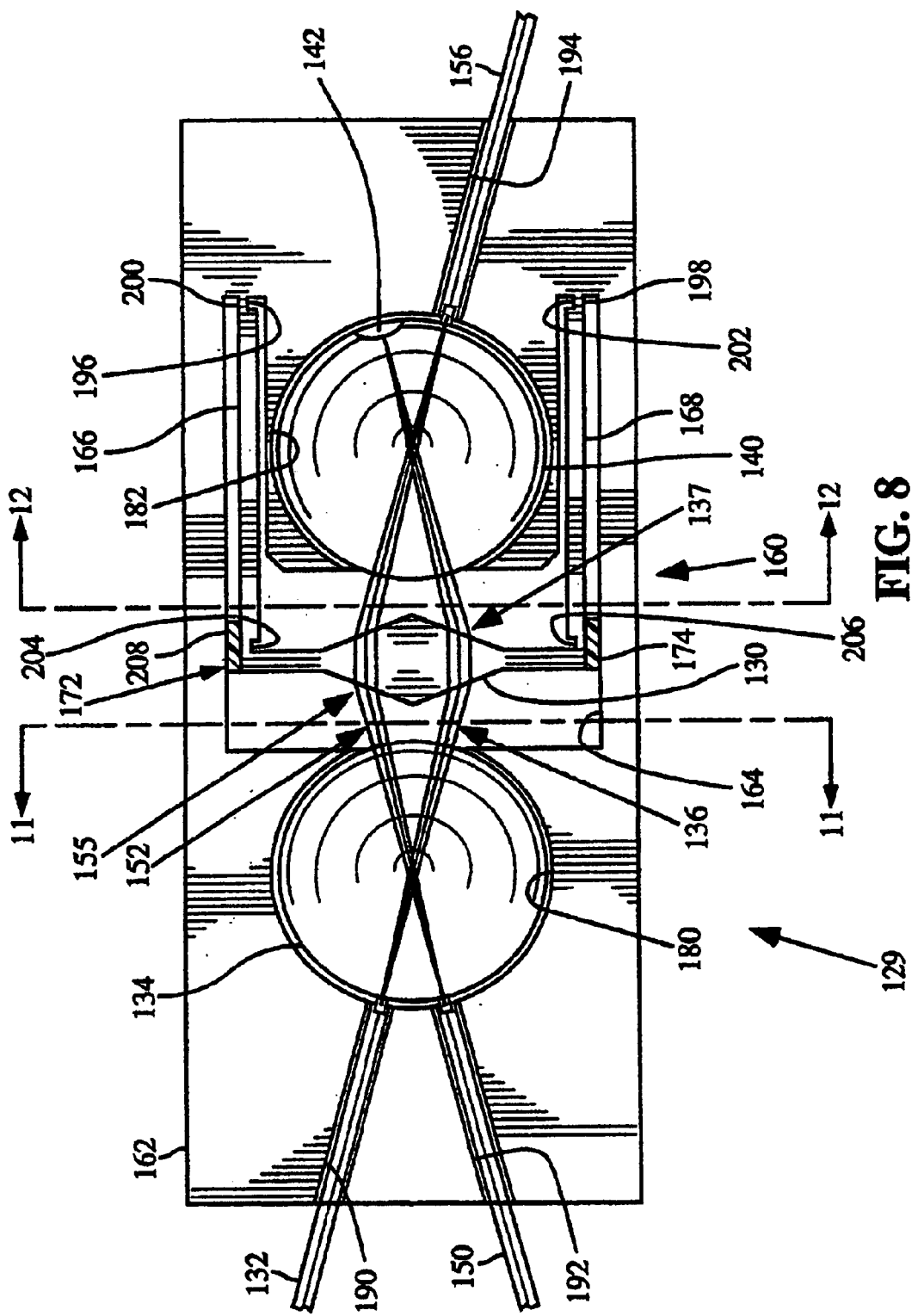
FIG. 8 is a top plan view of a sensor configuration that includes both a Michelson interferometer optical path and a Sagnac optical path utilizing a back-to-back equi-angular prism.

The prism 130 is supported by a frame 160 that is connected to a base 162. The frame 160 and base 162 preferably are integrally formed of single crystal silicon and are preferably fabricated by deep reactive ion etching (DRIE). Other techniques such as chemical etching may be used to fabricate the frame 160 and the base 162. The base 162 is generally rectangular as seen in FIG. 8 and includes a cavity 164. The frame 160 includes a pair of linkage arms 166 and 168 that are spaced apart and preferably arranged to be parallel to one another. The prism 130 is connected to between a first cross member 170 that extends perpendicularly from an end 172 of the linkage arm 166, and a second cross member 171 that extends perpendicularly from an end 174 of the linkage arm 168.

The ball lenses 134 and 140 may be mounted in corresponding cavities 180 and 182 formed in the base 162. The cavities 180 and 182 preferably are essentially cylindrical, but they may be etched as pyramidal depressions in the base 162. Referring to FIG. 11, in a preferred embodiment of the invention, there is an opening 184 in the cavity 180 so that the light beams 136 and 152 propagate between the ball lens 134 and the prism 130 without passing through the material that forms the base 162. A similar opening 186 is formed in the sidewall of the cavity 182 so that the light beams 136 and 152 may propagate between the prism 130 and the ball lens 140.

The optical fibers 132, 150 and 156 preferably are adhesively mounted in corresponding V-groves 190, 192 and 194 in the base 162.

Motion of the prism 130 is confined to a single axis of acceleration indicated by an arrow X. A first pair of hinges 196 and 198 is located near an end 200 of the linkage arm 166 and near an end 202 of the linkage arm 168, respectively. The hinges 196 and 198 are formed as reduced thickness portions of the linkage arms 166 and 168, respectively. A pair of similar hinges 204 and 206 is located near the ends 172 and 174 of the linkage arms 166 and 168, respectively. The hinges 196, 198, 204 and 206 cooperate to cause motion of prism 130 to be constrained to the direction X in response to acceleration of the prism 130.

A damping material 208 may be placed between the linkage arms 166 and 168 and the base 160 to provide control of the dynamic response of the device to acceleration inputs.

In order to multiplex a large number of Michelson interferometers at least two fiber optical couplers are required for each interferometer. One coupler extracts optical power from the buss, and the other splits this extracted power in half to feed each half of the interferometer. This second coupler also recombines the reflected optical power to produce the interference signal. Both of these couplers are usually in fiber form. The use of the splitter/combiner in fiber form makes the configuring of a balanced Michelson extremely difficult in that the fiber and optical path lengths on the interferometer side of the coupler must be matched to a fraction of the optical wavelength. It is also difficult to maintain balance wave paths as the temperature the device varies.

Figure 13:
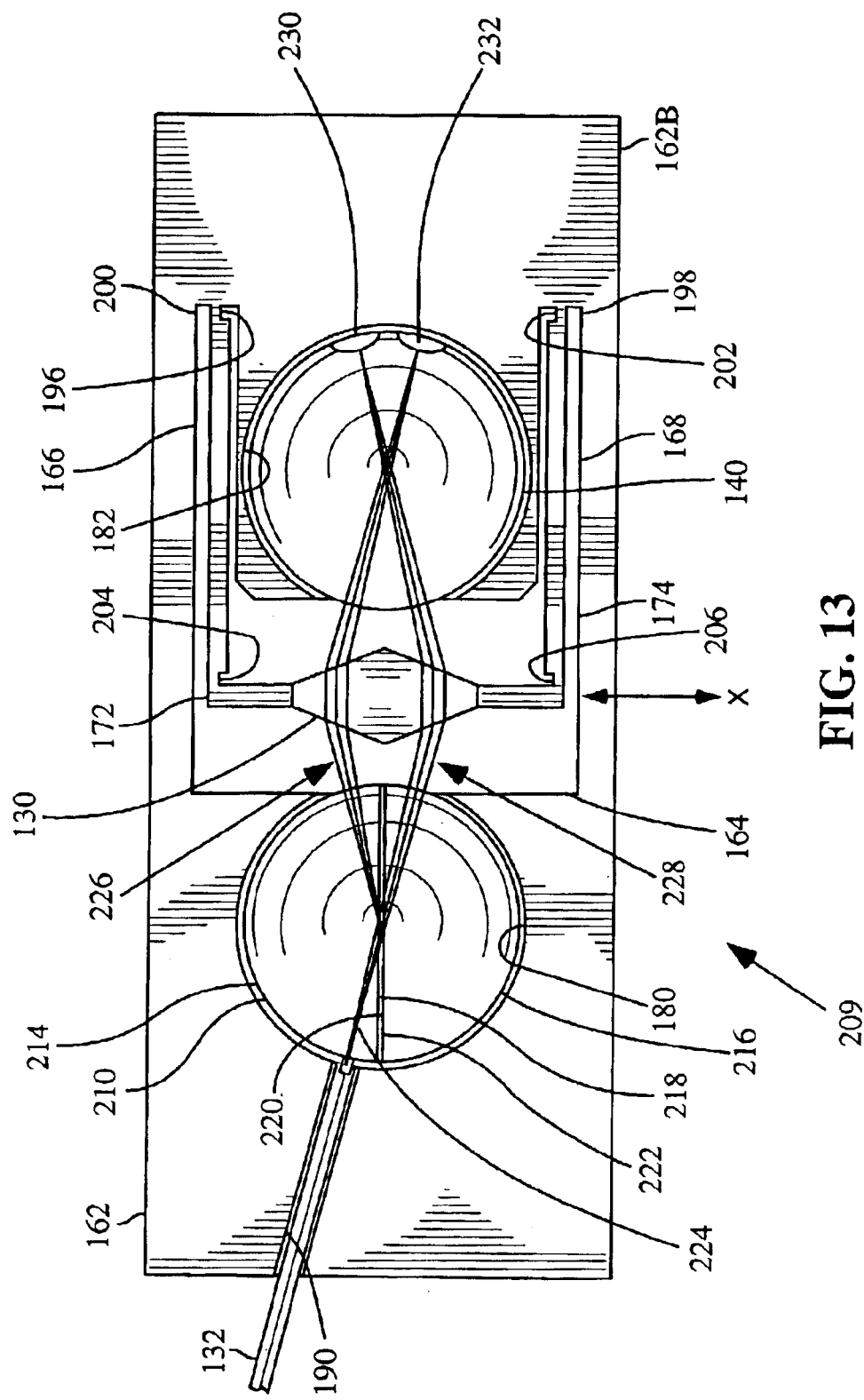
FIG. 13 is a top plan view of apparatus for forming a Michelson interferometer in accordance with the invention.

FIG. 13 shows the general arrangement of a Michelson interferometer accelerometer 209, which in some respects is similar to the accelerometer 160 of FIGS. 8 and 9 but is significantly different as explained below.

The transducer 209 includes a lens 210 that is formed of two lens components 214 and 216 that may be formed as hemispheres. The lens components 214 and 216 are mounted so that planar surfaces 218 and 220 are in facing relationship with a 50% beamsplitter 222 between them. Optical power enters the lens 210 via the fiber 132 and produces a light beam 224 that intercepts the beam splitting surface 222. The beam splitting surface creates beams 226 and 228 which traverse the back-to-back prism 130 and the ball lens 140 as shown. The optical beam 226 is focused on a mirror 230, which reflects the beam 226 back to the prism 130. The optical beam is focused on a mirror 232, which reflects the beam 228 back to the prism 130. Since reciprocity holds, the reflected beams 226 and 228 re-traverse the prism 130 and recombine at the beam splitting surface 222, producing the normal Cosine squared intensity fringe which is input to the fiber 132 and returns to the optical source. Movement of prism 130 in the positive or negative "X" direction causes the path lengths of both beams 226 and 228 to change differentially, which produces variation in the fringe pattern that is a measure of static or dynamic acceleration. This movement is permitted by the prism 130 acting as a proof mass and is essentially in plane with the "X" direction due to the parallelogram linkage arms 166 and 168.

The entire device except for the ball lenses is preferably fabricated out of Single Crystal Silicon (SCS), allowing the use of Deep Reactive Ion Etching (DRIE) through photo-lithographic masks. The use of a mask-produced device permits reproducibility in batch processing as well as retaining a balanced interferometer over large temperature changes.

The lens 210 may be fabricated by lapping a ball lens to form the hemispherical lens configuration 214 and coating the lapped surface with an appropriate film to produce the beam splitter 222. The lens 210 is then completed by adhering the hemisphere lens configurations 214 and 216 in facing relationship on opposite sides of the beamsplitter 222 to complete the sphere.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An acceleration transducer for use in an accelerometer, comprising:

a proof mass formed as a transmissive optics device arranged to receive an optical signal such that the optical signal propagates through the transmissive optics device along a first optical path having a selected optical path length; and a frame arranged to constrain the transmissive optics device to move from a reference position along a selected sensing axis in response to an acceleration of the proof mass along the selected sensing axis and produce an optical path length change that indicates the acceleration.

2. The transducer of claim 1 wherein the transmissive optics device comprises a prism.

3. The transducer of claim 1 wherein the transmissive optics device comprises a slab of optical material having a refractive index gradient in the direction of the sensing axis.

4. The transducer of claim 1, wherein the frame comprises:

a base having a first cavity therein;

a first linkage arm extending from the base into the first cavity; and a second linkage arm extending from the base into the first cavity, the proof mass being connected between the first linkage arm and the second linkage arm.

5. The transducer of claim 4 wherein the first and second linkage arms are parallel and the proof mass is arranged so that the sensing axis is perpendicular to the first and second linkage arms.

6. The transducer of claim 4, further comprising:

a first hinge formed in the first linkage arm; and a second hinge formed in the second linkage arm, the first and second hinges being arranged to facilitate movement of the proof mass along the sensing axis in response to acceleration along the sensing axis.

7. The transducer of claim 4, further comprising:

a first damping member mounted in the first cavity between the first linkage arm and the frame; and a second damping member mounted in the first cavity between the second linkage arm and the frame, the first and second damping members being arranged to control movement of the proof mass in response to acceleration along the sensing axis.

8. The transducer of claim 4, further comprising:

a first lens mounted to the frame;

a second lens mounted to the frame such that the transmissive optics device is between the first and second lenses;

a first optical fiber mounted to the frame with an end of the first optical fiber arranged to be adjacent the first lens;

a second optical fiber mounted to the frame with an end of the second optical fiber arranged to be adjacent the first lens;

a third optical fiber mounted to the frame with and end of the third optical fiber arranged to be adjacent the second lens; and a reflector mounted to the second lens, the first, second and third optical fibers, the transmissive optics device and the reflector being arranged such that a first light beam travels from the first optical fiber through the first lens, the transmissive optics device and the second lens into the third optical fiber to form a portion of a Sagnac interferometer and such that a second light beam travels from the second optical fiber through the first lens, the transmissive optics device and the second lens to the reflector and back through the second lens, the transmissive optics device and the first lens to the second optical fiber to form a portion of a Michelson interferometer.

9. The transducer of claim 8 wherein the first lens is mounted in a first recess in the base and the second lens is mounted in a second recess in the base.

10. The transducer of claim 8 wherein the first, second and third optical fibers are mounted in corresponding first, second and third V-grooves in the base.

11. The transducer of claim 1 wherein the transmissive optics device comprises a back-to-back equi-angular prism.

12. An acceleration transducer for use in an accelerometer, comprising:
- a frame;
- a first lens mounted to the frame;
- a beamsplitter formed in the first lens;
- a proof mass formed as a transmissive optics device arranged to receive an optical signal such that the optical signal propagates through the transmissive optics device along a first optical path having a selected optical path length;
- a second lens mounted to the frame such that the transmissive optics device is between the first and second lens;
- an optical fiber mounted to the frame with an end of the optical fiber arranged to be adjacent the first lens;
- a first reflector mounted to the second lens; and
- a second reflector mounted to the second lens, the optical fiber, the transmissive optics device and the first and second reflectors being arranged such that a light beam travels from the optical fiber into the first lens to the beamsplitter with a first portion of the light beam traveling through the transmissive optics device and the second lens to the first reflector and a second portion of the light beam reflecting from the beam splitter and traveling through the transmissive optics device and the second lens to the second reflector with reflected light beams from the first reflector and the second reflector traveling back through the transmissive optics device and combining in the beam splitter to form an interference pattern.

13. The transducer of claim 12 wherein the first lens is mounted in a first recess in the base and the second lens is mounted in a second recess in the base.

14. The transducer of claim 12 wherein the optical fiber is mounted in a V-groove in the base.

15. An acceleration transducer, comprising
- means for producing a first optical signal and a second optical signal;
- a proof mass formed to include a transmissive optics device arranged to receive the first and second optical signals such that the first and second optical signals propagate through the transmissive optics device along corresponding first and second optical paths that are included in the interferometer, and
- a support assembly arranged to support the proof mass such that the transmissive optics device moves from a reference position along a selected sensing axis in response to an acceleration of the proof mass along the selected sensing axis and produces changes in the first and second optical paths to produce an interference signal that indicates changes in acceleration of the transmissive optics device along the selected sensing axis.

16. The acceleration transducer of claim 15 wherein the support assembly is arranged to apply a restoring force to the proof mass to return it to the reference position when the acceleration along the selected sensing axis is zero.

* * * * *